March 24, 1936.  E. S. COOK ET AL  2,035,046
FLUID PRESSURE BRAKE
Filed Nov. 23, 1933
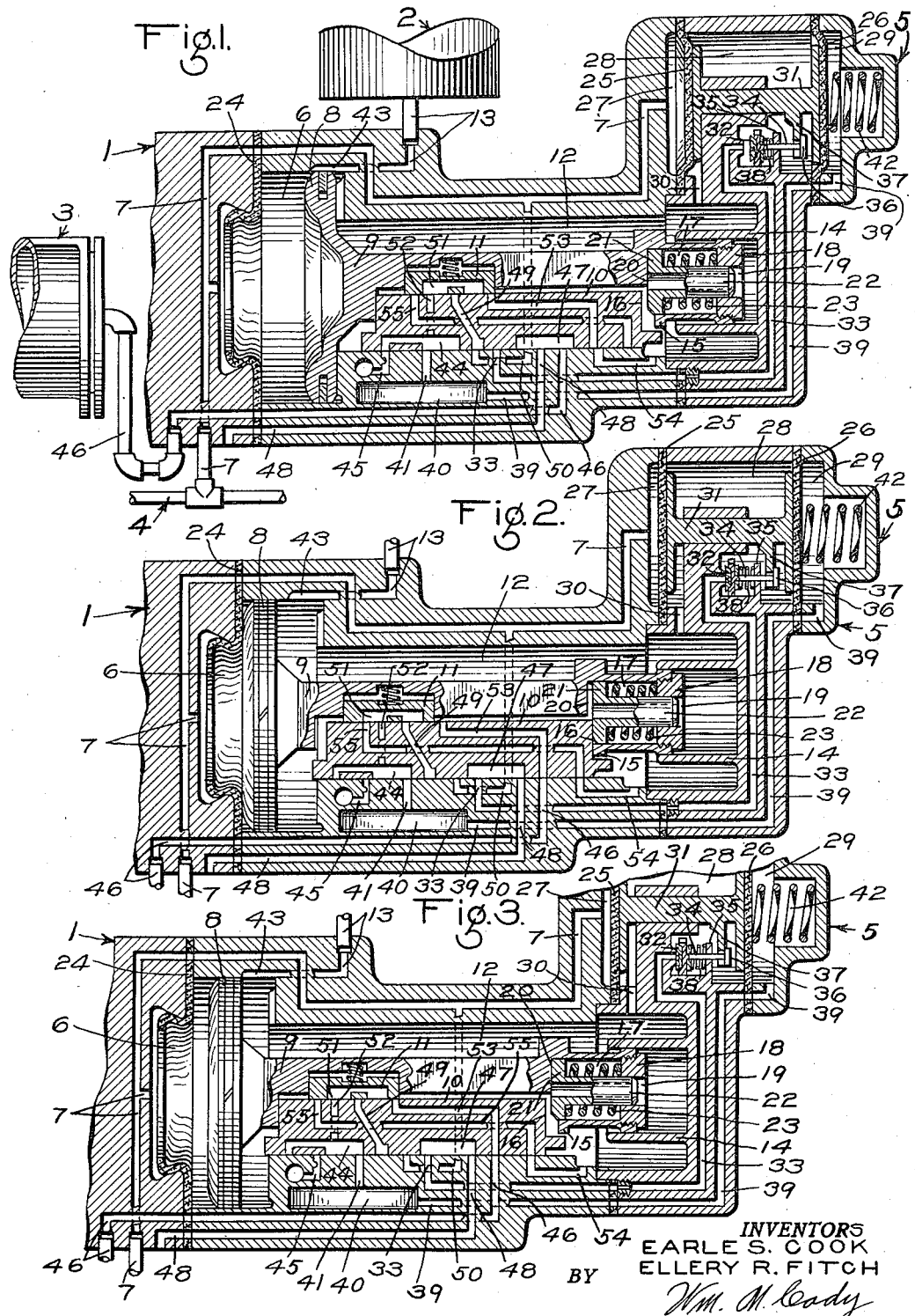
INVENTORS
EARLE S. COOK
ELLERY R. FITCH
BY Wm. M. Cady
ATTORNEY Patented Mar. 24, 1936

2,035,046

UNITED STATES PATENT OFFICE 2,035,046

FLUID PRESSURE BRAKE

Earle S. Cook, Wilkinsburg, and Ellery R. Fitch, Irwin, Pa., assignors to The Westinghouse Air Brake Company, Wilmerding, Pa., a corporation of Pennsylvania Application November 23, 1933, Serial No. 699,320

10 Claims. (Cl. 303—70)

This invention relates to fluid pressure brake equipment and more particularly to that type of equipment shown and described in an application of Clyde C. Farmer, Serial No. 612,465, filed May 20, 1932.

The principal object of the invention is to provide a novel and effective release insuring mechanism for fluid pressure brake equipment and more particularly for equipment of the above mentioned type.

Another object of the invention is to provide a release insuring mechanism which, when associated with the triple valve device and auxiliary reservoir of a fluid pressure brake equipment and a release of the brakes is initiated, is adapted to function, regardless of any increase in the pressure of fluid in the triple valve slide valve chamber and auxiliary reservoir by leakage of fluid under pressure past the triple valve piston to the valve chamber, to reduce auxiliary reservoir pressure acting on the valve side of the piston so as to facilitate the creation of an operating fluid pressure differential of sufficient magnitude on the piston to insure prompt movement of the piston and associated slide valves to a brake releasing position.

Other objects and advantages will appear in the following more detailed description of the invention.

In the accompanying drawing; Fig. 1 is a diagrammatic view, mainly in section, of a triple valve device having the invention associated therewith, the several movable parts of the apparatus being shown in their normal release position; and Figs. 2 and 3 are similar views illustrating the various parts in their service position and service lap position, respectively.

The release insuring mechanism constituting the present invention is adapted to insure the brake releasing movement of the triple valve device of a fluid pressure brake equipment and for the purpose of simplifying the following description, the invention is shown in the drawing as being embodied in a simple fluid pressure brake equipment.

The fluid pressure brake equipment shown in the drawing comprises a triple valve device 1, an auxiliary reservoir 2, a brake cylinder 3, a brake pipe 4 and a release insuring valve device 5.

The triple valve device 1 comprises a casing having a piston chamber 6 connected through a passage and pipe 7 to the brake pipe 4 and contains a piston 8 having a stem 9 adapted to actuate a main slide valve 10 and an auxiliary slide valve 11 contained in a chamber 12 connected through a passage and pipe 13 to the auxiliary reservoir 2, said auxiliary slide valve having a limited movement relative to the main slide valve.

The rear end portion of the piston stem 9 is slidably guided in an annular lug 14 carried by the casing and is provided with an operating collar or lug 15 which is located a short distance inwardly from the rear end of the stem and which is adapted to operatively engage a rear end surface 16 of the main slide valve 10.

The rear end portion of the piston stem 9 is provided with a bore 17 which is closed at one end by a plug 18 having screw-threaded connection with the stem, said plug being provided with a central bore 19. Below the lower surface of the major portion of the piston stem, the other end of the bore 17 is open and above said surface is closed so as to form a shoulder 20 which is adapted to be engaged by a plunger 21 slidably engaging the stem within the bore 17. The plunger has a stem 22 which is slidably guided by the plug 18 within the bore 19. Interposed between and engaging one side of the plunger 21 and the plug 18 is a spring 23 which acts to normally maintain the plunger in engagement with the shoulder 20. In this position, the face of the plunger will be closer to the rear surface 16 of the main slide valve than will be the outer face of the collar 15 of the piston stem, so that in effecting an application of the brakes, the plunger will engage the main slide valve and yieldably resist movement of the piston and auxiliary slide valve relative to the main slide valve. The purpose of this is to stabilize the action of the triple valve parts in effecting an application of the brakes. This stabilizing mechanism, in effecting the release of the brakes, assists in moving the piston out of sealing engagement with a gasket 24 which is clamped between two sections of the casing, and also serves as a graduating mechanism for shifting the triple valve piston and auxiliary slide valve 11 to service lap position.

The release insuring valve device may comprise a casing in which there are secured, in spaced relation to each other, flexible diaphragms 25 and 26, which diaphragms, together with the casing, define chambers 27, 28 and 29. The chamber 27 is at one side of the diaphragm 25 and is connected to the passage 7 leading from the brake pipe 4. The chamber 28 is between the diaphragms and is connected through a passage 30 with the triple valve slide valve chamber 12. Contained in chamber 28 and slidably mounted in the casing is a follower member 31 which is operative by said diaphragms to effect the operation of a release insuring valve 32, also contained in the chamber 28, for controlling the opening and closing of a communication from the chamber 28 to a passage 33 leading to the seat of the main slide valve 10. In the present embodiment of the invention, the valve 32 is provided with a stem 34 which is slidably guided in a lug 35 carried by the casing, and at its end this stem is provided with an enlargement or head 36 which is adapted to be operatively engaged by a lug 37 carried by the follower member 31. Interposed between and engaging the valve 32 and lug 35 is a coil spring 38 which at all times tends to move the valve toward its seating position.

The chamber 29, which may be termed the control chamber, is connected through a passage 39 to a preliminary quick service chamber 40 which is connected to a passage 41 leading to the seat of the main slide valve 10. Contained in chamber 29 and interposed between and operatively engaging the diaphragm 26 and the casing is a coil spring 42 which, as will hereinafter more fully appear, is adapted, under certain operating conditions, to assist in moving the several parts of the release insuring valve device to the position in which they are shown in Fig. 2.

In initially charging the equipment, fluid under pressure is supplied to the brake pipe 4 in the usual manner and from thence flows through pipe and passage 7 to the triple valve piston chamber 6 and to the diaphragm chamber 27 of the release insuring valve device 5.

Assuming the triple valve parts to be in their release position, as shown in Fig. 1 of the drawing, fluid under pressure supplied to the piston chamber 6 flows therefrom through a feed groove 43 to the triple valve slide valve chamber 12, and from said valve chamber through pipe and passage 13 to the auxiliary reservoir 2. Fluid under pressure also flows from the chamber 12 through passage 30 to the chamber 28 of the release insuring valve device.

With the main slide valve 10 in release position, the control chamber 29 of the release insuring valve device is open to the atmosphere by way of passage 39, quick service chamber 40, passage 41, a cavity 44 in the main slide valve 10 and a restricted passage 45. Since the chamber 29 is at atmospheric pressure, fluid under pressure supplied from the brake pipe to the diaphragm chamber 27 causes the diaphragm 26 to flex in a direction toward the right hand, causing the follower member 31 to move in the same direction, flexing the diaphragm and thereby compressing the spring 43. Since the lug 37 of the follower member is in operative engagement with the head 36 of the release valve stem 34, the release insuring valve 32 is moved out of engagement with the valve seat against the opposing pressure of the light spring 38. With the valve 32 unseated the chamber 28 and consequently the triple valve slide valve chamber 12 and auxiliary reservoir 2 are in communication with the passage 33, but since, as shown in Fig. 1, this passage is lapped by the main slide valve 10 no release of fluid under pressure from said chambers and auxiliary reservoir will occur.

Further with the main slide valve in release position, the brake cylinder 3 is open to the atmosphere by way of a pipe and passage 46, a cavity 47 in said slide valve and a passage 48.

If it is desired to effect an application of the brakes, a reduction in brake pipe pressure is initiated in the usual manner. This effects a corresponding reduction in the pressure of fluid in the triple valve piston chamber 6, and as a result fluid in the valve chamber 12 at auxiliary reservoir pressure causes the piston 8 to move outwardly toward application position, the piston in its initial movement shifting the auxiliary slide valve 11 relative to the main slide valve 10 and closing the feed groove 43. At substantially the same time as the feed groove is closed, the plunger 21 is brought into engagement with the rear surface 16 of the main slide valve. As the piston continues to move toward application position the slide valve 10 prevents forward movement of the plunger with the result that there is a relative movement between the plunger and the piston stem 9 which is yieldably resisted by the spring 23 until the collar 15 on the piston stem engages the rear surface 16 of the main slide valve.

As the spring 23 is being compressed the piston stem 9 causes the auxiliary slide valve 11 to continue to move relative to the main slide valve 10 to its quick service position, in which position, a port 49 in the main slide valve which is in registration with a branch 50 of the brake pipe passage 7 is connected through a cavity 51 in the auxiliary slide valve 11 to a port 52 leading to the cavity 44 in the main slide valve. With this quick service communication established, fluid under pressure is vented from the brake pipe to the quick service chamber 40 by way of cavity 44 and passage 41 and is also vented to the atmosphere by way of the restricted passage 45, causing a fairly rapid local reduction in brake pipe pressure. The flow of fluid from the brake pipe to the quick service chamber 40 will be at a faster rate than fluid can flow through the restricted passage 45 to the atmosphere so that fluid under pressure will flow from this chamber by way of passage 39 to the control chamber 29 of the release insuring valve device 5.

The reduction in brake pipe pressure also effects a corresponding reduction in the diaphragm chamber 27 of the release insuring valve device, so that the pressure of fluid in chamber 29, together with the pressure of the spring 42, causes the diaphragm 26 to flex inwardly and thereby shift the follower member 31 in a direction toward the left hand, permitting the spring 38 to act to seat the release valve 32, thus closing the communication from the chamber 28 to the passage 33.

After the collar 15 of the piston stem 9 has engaged the rear surface 16 of the main slide valve, the piston 8 and slide valves 10 and 11 will be moved in unison to application position in which the piston engages the gasket 24 and in which fluid under pressure is supplied from the auxiliary reservoir to the brake cylinder by way of pipe and passage 13, triple valve slide valve chamber 12, a service port 53 in the main slide valve, and passage and pipe 46.

Upon the initial movement of the main slide valve toward application position the communication between the quick service chamber 40 and the atmospheric passage 45 is closed before communication between the port 49 and the brake pipe branch passage 50 is closed. This insures the maintenance of a sufficient fluid pressure in the chamber 29 to hold the follower member 30 in its inner position, as shown in Fig. 2, in which position the valve 32 is held seated by the action of the spring 38.

With the main slide valve in application position, the slide valve chamber 12 is in communication with the control chamber 29 of the release insuring valve device by way of a passage 54, a port 55 in the main slide valve, cavity 51 in the auxiliary slide valve 11, port 52 and cavity 44 in the main slide valve, passage 41, quick service chamber 40 and passage 39. With this communication established the pressures in the chambers 29 and 12 will equalize and will reduce as fluid flows from the auxiliary reservoir to the brake cylinder.

Inasmuch as the fluid in chamber 29 is at reduced auxiliary reservoir pressure, and fluid in chamber 27 is at reduced brake pipe pressure, which is substantially the same as reduced auxiliary reservoir pressure, the diaphragms and associated parts of the release insuring valve device will remain in their valve closed position, the spring 42 resisting accidental movement of the parts from such position and the spring 38 maintaining the valve 32 seated.

Now when auxiliary reservoir pressure in the triple valve slide valve chamber 12 has been reduced by the flow of fluid therefrom to the brake cylinder to substantially the reduced brake pipe pressure in piston chamber 6, the spring 23 which has been previously compressed acts to move the piston stem 9 and thereby the piston 8 and auxiliary slide valve inwardly relative to the main slide valve, which movement continues until the shoulder 20 of the piston stem engages the plunger 21, at which time the action of the spring ceases and the piston and auxiliary slide valve come to a stop in lap position as shown in Fig. 3, in which position the auxiliary slide valve laps the service port 53, thus closing off further flow of fluid to the brake cylinder.

Upon the initial movement of the triple valve piston 8 toward lap position, the auxiliary slide valve 11 laps the port 55, thus closing the communication between the triple valve slide valve chamber 12 and the control chamber 29 of the release insuring valve device. With the auxiliary slide valve in lap position, fluid at reduced auxiliary reservoir pressure is bottled up in the control chamber 29.

When it is desired to release the brakes, fluid under pressure is supplied to the brake pipe 4 in the usual manner and since the brake pipe is in communication through passage 7 with the triple valve piston chamber 6 and diaphragm chamber 27 of the valve device 5, the pressure of fluid in both of these chambers will increase with brake pipe pressure.

When the pressure of fluid in the piston chamber exceeds the auxiliary reservoir pressure in the slide valve chamber 12 by about one and one-quarter pounds, the piston 8 and thereby the slide valves 12 and 11 are caused to move to their release position in which the auxiliary reservoir 2, slide valve chamber 12 and diaphragm chamber 28 are charged with fluid at brake pipe pressure in the same manner as hereinbefore described in connection with the initial charging of the equipment. In the release position of the main slide valve 10, fluid under pressure is vented from the brake cylinder to the atmosphere by way of pipe and passage 46, cavity 47 in the main slide valve and atmospheric passage 48, and fluid under pressure is vented from the control chamber 29 to the atmosphere by way of passage 39, quick service chamber 40, passage 41, cavity 44 in the main slide valve and restricted passage 45. Upon the venting of fluid from the chamber 29, fluid at brake pipe pressure in chamber 27 causes the several parts of the release insuring valve device 5 to move to the position in which they are shown in Fig. 1 of the drawing.

It will here be understood that the diaphragm will flex inwardly and shift the follower member in a direction toward the right hand a sufficient distance to unseat the release valve 32 when the brake pipe pressure is increased about one and one-half pounds above the reduced auxiliary reservoir pressure bottled up in the control chamber 29, so that if upon an increase in brake pipe pressure in initiating the release of the brakes, the several parts of the triple valve device should for any reason fail to move to release position when the required operating fluid pressure differential of one and one quarter pounds has been created on the triple valve piston, or if due to leakage of fluid past the triple valve piston, the required operating fluid pressure cannot be obtained or is obtained so slowly as to render the operation of the parts sluggish, the release insuring valve device will function to vent fluid under pressure from the auxiliary reservoir and thus cause a sufficient fluid pressure differential to be created on the piston to insure the prompt movement of the triple valve parts to their release position. The flow of fluid from the auxiliary reservoir, slide valve chamber 12 and chamber 28 is past the unseated release valve 32, through passage 33, cavity 47 in the main slide valve 10 and atmospheric passage 48.

It will be apparent from the foregoing description that in initiating the release of the brakes after either a service or an emergency application, the auxiliary slide valve 11 of the triple valve device is shifted to close the communication from the slide valve chamber 12 to the control chamber 29 of the release insuring valve device before the brake pipe pressure can exceed auxiliary reservoir pressure, so that any increase in auxiliary reservoir pressure which may be effected by leakage of fluid from the triple valve piston chamber past the triple valve piston when the brake pipe pressure becomes higher than auxiliary reservoir pressure cannot effect an increase in the reduced auxiliary reservoir pressure bottled up in the control chamber, and by reason of this the positive operation of the release insuring valve device is insured at all times.

It will be understood that the subject matter relating to the feature of venting fluid under pressure from the auxiliary reservoir upon an increase in brake pipe pressure in initiating a release of the brakes so as to facilitate the movement of the parts of a brake controlling valve mechanism to release position is broadly covered in a copending application of Clyde C. Farmer, Serial No. 612,465, filed May 20, 1932, and that the claims in the present application which relate to this feature are intended to cover a specific form of release insuring valve mechanism wherein an increase in the pressure of the valve chamber of the brake controlling valve mechanism, due to leakage of fluid past the piston of the valve mechanism will have no effect upon the operation of the release insuring valve mechanism.

It will also be understood that the feature of stabilizing the quick service action of the triple valve device and the quick service features shown but not claimed in the present application are broadly covered in the above mentioned copending application of Clyde C. Farmer and in an application of Clyde C. Farmer, Serial No. 473,323, filed August 6, 1930.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, a chamber normally charged with fluid under pressure and a brake cylinder, of a brake controlling valve device comprising a piston subject to the opposing pressures of the brake pipe and said chamber and also comprising valve means movable by said piston upon a reduction in brake pipe pressure to supply fluid under pressure from said chamber to the brake cylinder and movable by said piston upon an increase in brake pipe pressure for releasing fluid under pressure from the brake cylinder, a control chamber, means included in said valve means for regulating the pressure of fluid in said control chamber when said valve means is in position to supply fluid under pressure to the brake cylinder, means included in said valve means for establishing a communication through which fluid under pressure is adapted to be vented from the first mentioned chamber when the valve means is in position to supply fluid under pressure to the brake cylinder, and valve mechanism subject to the reduced brake pipe pressure and the opposing pressure of the control reservoir for preventing the flow of fluid from the first mentioned chamber by way of said communication and operable upon an increase in brake pipe pressure for venting fluid under pressure from the first mentioned chamber, said valve means being operable in initiating the release of the brakes for preventing an increase in the pressure of fluid in the first mentioned chamber from effecting an increase in the pressure of fluid in the control chamber.

2. In a fluid pressure brake, the combination with a brake pipe, a chamber normally charged with fluid under pressure and a brake cylinder, of a brake controlling valve device comprising a piston subject to the opposing pressures of the brake pipe and said chamber and also comprising valve means movable by said piston upon a reduction in brake pipe pressure to supply fluid under pressure from said chamber to the brake cylinder and movable by said piston upon an increase in brake pipe pressure for releasing fluid under pressure from the brake cylinder, a control chamber, means included in said valve means for regulating the pressure of fluid in said control chamber when said valve means is in position to supply fluid under pressure to the brake cylinder, means included in said valve means for establishing a communication through which fluid under pressure is adapted to be vented from the first mentioned chamber when the valve means is in position to supply fluid under pressure to the brake cylinder, and valve mechanism subject to the reduced brake pipe pressure and the opposing pressure of the control reservoir for preventing the flow of fluid from the first mentioned chamber by way of said communication and operable upon an increase in brake pipe pressure for venting fluid under pressure from the first mentioned chamber, said valve means being adapted to prevent any increase in the pressure of fluid in the control chamber when in moving the brake controlling valve device toward release position the pressure of fluid in the first mentioned chamber is increased.

3. In a fluid pressure brake, the combination with a brake pipe, a chamber normally charged with fluid under pressure and a brake cylinder, of a brake controlling valve device comprising a piston subject to the opposing pressures of the brake pipe and said chamber and also comprising valve means movable by said piston upon a reduction in brake pipe pressure to supply fluid under pressure from said chamber to the brake cylinder and movable by said piston upon an increase in brake pipe pressure for releasing fluid under pressure from the brake cylinder, a control chamber, means included in said valve means for regulating the pressure of fluid in said control chamber when said valve means is in position to supply fluid under pressure to the brake cylinder, means included in said valve means for establishing a communication through which fluid under pressure is adapted to be vented from the first mentioned chamber when the valve means is in position to supply fluid under pressure to the brake cylinder, and valve mechanism subject to the reduced brake pipe pressure and the opposing pressure of the control reservoir for preventing the flow of fluid from the first mentioned chamber by way of said communication and operable upon an increase in brake pipe pressure for venting fluid under pressure from the first mentioned chamber, said valve means being adapted to prevent any increase in the pressure of fluid in the control chamber when in moving the brake controlling valve device toward release position the pressure of fluid in the first mentioned chamber is increased by the leakage of fluid from the brake pipe past the piston to the first mentioned chamber.

4. In a fluid pressure brake, the combination with a brake pipe, a chamber normally charged with fluid under pressure and a brake cylinder, of a brake controlling valve device comprising a piston subject to the opposing pressures of the brake pipe and said chamber and also comprising valve means movable by said piston upon a reduction in brake pipe pressure to supply fluid under pressure from said chamber to the brake cylinder and movable by said piston upon an increase in brake pipe pressure for releasing fluid under pressure from the brake cylinder, a control chamber, means included in said valve means for regulating the pressure of fluid in said control chamber when said valve means is in position to supply fluid under pressure to the brake cylinder, means included in said valve means for establishing a communication through which fluid under pressure is adapted to be vented from the first mentioned chamber when the valve means is in position to supply fluid under pressure to the brake cylinder, valve mechanism subject to the reduced brake pipe pressure and the opposing pressure of the control reservoir for preventing the flow of fluid from the first mentioned chamber by way of said communication and operable upon an increase in brake pipe pressure for venting fluid under pressure from the first mentioned chamber, and means operable when the brake pipe pressure and the pressure in the first mentioned chamber are substantially equal for operating said piston and thereby the valve means to prevent an increase in the pressure of fluid in the first mentioned chamber when the brake pipe pressure is increased above the chamber pressure from effecting an increase in the pressure of fluid in the control chamber.

5. In a fluid pressure brake, the combination with a brake pipe, a chamber normally charged with fluid under pressure and a brake cylinder, of a brake controlling valve device comprising a piston subject to the opposing pressures of the brake pipe and said chamber and also comprising valve means movable by said piston upon a reduction in brake pipe pressure to supply fluid under pressure from said chamber to the brake cylinder and movable by said piston upon an increase in brake pipe pressure for releasing fluid under pressure from the brake cylinder, a control chamber, means included in said valve means establishing a communication through which the pressures in the first mentioned chamber and control chamber equalize when said valve means is in position to supply fluid under pressure to the brake cylinder, means included in said valve means establishing a communication through which fluid under pressure is adapted to be vented from the first mentioned chamber, valve mechanism subject to the reduced brake pipe pressure and the opposing pressure of the control chamber for maintaining the second mentioned communication closed until, upon initiating the release of the brakes, the brake pipe pressure exceeds the control chamber pressure, and means operable when the brake pipe pressure and the pressure of the first mentioned chamber are substantially equal for actuating said valve means to close the communication between the first mentioned chamber and control chamber.

6. In a fluid pressure brake, the combination with a brake pipe and a chamber charged with fluid under pressure, of an equalizing valve device subject to the opposing pressures of the brake pipe and said chamber and movable upon a reduction in brake pipe pressure for effecting an application of the brakes and movable when the brake pipe pressure exceeds the chamber pressure for effecting a release of the brakes, a control chamber, means included in the equalizing valve device operative in the brake applying position of the equalizing valve device for establishing a communication through which the pressures in said chambers equalize, means included in the equalizing valve device for closing said communication when with the equalizing valve device in brake applying position the pressures of the brake pipe and first mentioned chamber are substantially equal, and valve means subject to the opposing pressures of the brake pipe and control chamber and operative upon an increase in brake pipe pressure for venting fluid under pressure from the first mentioned chamber to facilitate the movement of the equalizing valve device to release position.

7. In a fluid pressure brake, the combination with a brake pipe and a chamber charged with fluid under pressure, of an equalizing valve device subject to the opposing pressures of the brake pipe and said chamber and movable upon a reduction in brake pipe pressure for effecting an application of the brakes and movable when the brake pipe pressure exceeds the chamber pressure for effecting a release of the brakes, a control chamber, means included in the equalizing valve device operative in the brake applying position of the equalizing valve device for establishing a communication through which the pressures in said chambers equalize, means included in the equalizing valve device for closing said communication when with the equalizing valve device in brake applying position the pressures of the brake pipe and first mentioned chamber are substantially equal, valve means subject to the opposing pressures of the brake pipe and control chamber and operative upon an increase in brake pipe pressure for venting fluid under pressure from the first mentioned chamber to facilitate the movement of the equalizing valve device to release position, and means included in the equalizing valve device for closing off the flow of fluid from the first mentioned chamber as the equalizing valve device moves toward release position.

8. In a fluid pressure brake, the combination with a brake pipe and a chamber charged with fluid under pressure, of an equalizing valve device subject to the opposing pressures of the brake pipe and said chamber and movable upon a reduction in brake pipe pressure for effecting an application of the brakes and movable from application position to lap position when the pressures of the brake pipe and said chamber are substantially equal and movable when the brake pipe pressure exceeds the chamber pressure for effecting a release of the brakes, a control chamber in open communication with the first mentioned chamber when the equalizing valve device is in application position, means subject to the opposing pressures of the brake pipe and the control chamber and operated upon an increase in brake pipe pressure for venting fluid under pressure from the first mentioned chamber to facilitate the release movement of the equalizing valve device, and means for closing the communication between said chambers upon the movement of the equalizing valve device from brake applying position toward lap position.

9. In a fluid pressure brake, in combination, a brake pipe, an equalizing valve device subject to the opposing pressures of the brake pipe and a chamber and movable upon a reduction in brake pipe pressure to supply fluid under pressure from said chamber to effect an application of the brakes and operated upon an increase in brake pipe pressure and a reduction in the reduced auxiliary reservoir pressure to effect a release of the brakes, a valve operative to effect a reduction in the reduced auxiliary reservoir pressure, means subject to brake pipe pressure and an opposing control pressure corresponding to the reduced auxiliary reservoir pressure and operated upon an increase in brake pipe pressure and independently of any increase in auxiliary reservoir pressure for actuating said valve.

10. In a fluid pressure brake, in combination, a brake pipe, a reservoir, an equalizing valve device subject to the opposing pressures of the brake pipe and auxiliary reservoir and movable upon a reduction in brake pipe pressure for supplying fluid under pressure from said reservoir to effect an application of the brakes, the flow of fluid to effect an application of the brakes effecting a reduction in the pressure of fluid in the auxiliary reservoir, said equalizing valve device being movable upon an increase in brake pipe pressure and a reduction in the reduced auxiliary reservoir pressure to a position for effecting a release of the brakes, and valve means subject to the pressure of the brake pipe and an opposing control pressure corresponding to the reduced auxiliary reservoir pressure and operative upon an increase in brake pipe pressure over the control pressure for venting fluid under pressure from the auxiliary reservoir, the operation of said valve means to vent fluid under pressure from the auxiliary reservoir being unaffected by variations in auxiliary reservoir pressure.

EARLE S. COOK.
ELLERY R. FITCH.